(12) United States Patent
Kumamoto et al.

(10) Patent No.: US 6,745,642 B2
(45) Date of Patent: Jun. 8, 2004

(54) ACCELERATOR PEDAL ASSEMBLY

(75) Inventors: Masato Kumamoto, Odawara (JP); Takumi Oikawa, Odawara (JP)

(73) Assignee: Mikuni Corporation, Tokyo (JP)

( * ) Notice: Subject to any disclaimer, the term of this patent is extended or adjusted under 35 U.S.C. 154(b) by 41 days.

(21) Appl. No.: 10/096,938

(22) Filed: Mar. 14, 2002

(65) Prior Publication Data

US 2002/0100341 A1 Aug. 1, 2002

Related U.S. Application Data

(63) Continuation-in-part of application No. PCT/JP00/06188, filed on Sep. 11, 2000.

(30) Foreign Application Priority Data

Sep. 14, 1999 (JP) .............................. 11-260967
Oct. 27, 1999 (JP) .............................. 11-305212

(51) Int. Cl.[7] ................................ G05G 1/14
(52) U.S. Cl. ......................... 74/512; 74/513; 74/514; 74/560
(58) Field of Search .................. 74/512, 560, 513; 123/399; 188/83; 180/335

(56) References Cited

U.S. PATENT DOCUMENTS

| | | | | |
|---|---|---|---|---|
| 5,768,946 A | * | 6/1998 | Fromer et al. ................ | 74/514 |
| 6,070,490 A | * | 6/2000 | Aschoff et al. ............... | 74/513 |
| 6,263,758 B1 | | 7/2001 | Kumamoto et al. | |
| 2002/0152831 A1 | * | 10/2002 | Sakamoto et al. ............ | 74/512 |
| 2003/0047023 A1 | * | 3/2003 | Huesges et al. .............. | 74/514 |

FOREIGN PATENT DOCUMENTS

| | | | | |
|---|---|---|---|---|
| DE | 004426549 A1 | * | 2/1996 | .................. 74/512 |
| DE | 019755098 A1 | * | 6/1999 | .................. 74/512 |
| EP | 000708006 A1 | * | 4/1996 | .................. 74/512 |
| JP | 10-83224 | | 3/1998 | |
| JP | 11-235936 | | 8/1999 | |
| WO | WO 97/30863 | * | 8/1997 | .................. 74/512 |

* cited by examiner

Primary Examiner—Vinh T. Luong
(74) Attorney, Agent, or Firm—Wenderoth, Lind & Ponack, L.L.P.

(57) ABSTRACT

An accelerator pedal assembly comprises a pedal arm, a pedal shaft, a return spring and a frictional force generating mechanism for generating frictional force according to movement of the pedal arm. The frictional force generating mechanism has a sliding guide path defining a sliding surface for generating frictional force and a frictional force varying mechanism located within the sliding guide path for varying frictional force according to movement of the pedal arm in such a manner that the frictional force generated when the pedal arm moves towards the position of maximum depression increases according to the amount of movement, and the frictional force generated when the pedal arm moves towards the rest position is reduced according to the amount of movement. This enables the assembly to be made smaller and means that the accelerator pedal assembly operates more smoothly as a result of superior depression force hysteresis.

16 Claims, 6 Drawing Sheets

ACCELERATOR PEDAL ASSEMBLY

This is a continuation-in-part of International application No. PCT/JP00/06188 filed Sep. 11, 2000.

BACKGROUND OF THE INVENTION

1. Field of the Invention

The present invention relates to an accelerator pedal assembly applicable to a vehicle, etc., and more particularly relates to an accelerator pedal assembly applicable to vehicles adopting a drive by wire system.

2. Description of Related Art

Electronically controlled throttle systems such as drive-by-wire systems are well known as methods for performing fine control in a highly precise manner on the combustible state, output, and rotational control etc. of an engine mounted in a vehicle, particularly in an automobile. Rather than having an accelerator pedal and a throttle valve connected by an accelerator cable, such electronically controlled throttle systems (drive-by-wire systems) convert the extent to which an accelerator pedal is pressed down to an electrical signal, and output of the engine is controlled based on this converted electrical signal.

In such drive-by-wire systems, the operating load of the throttle valve does not act on the accelerator pedal as a pedal load. When the vehicle is then made to advance at a fixed speed (when the accelerator is held at a fixed position), a mechanism for supplementing this load, so that the driver does not become tired, is required. When vehicle acceleration fluctuates due to changes in engine output, etc., the driver is subjected to the influence of an oscillatory system, causing the pressing of the accelerator pedal to easily fluctuate, inviting vibration of the vehicle towards the front and rear. A mechanism is therefore required to generate a force resisting the pushing down of the accelerator pedal in order to prevent such vibration.

The mechanism disclosed in, for example, Japanese Patent Laid-open Publication No. Hei. 11-235936 is well known as an accelerator pedal assembly for dealing with this problem. The accelerator pedal assembly disclosed in this publication comprises a pedal arm capable of swinging from a rest position to a maximum depression position due to depression force from an accelerator pedal, a return spring causing the pedal arm to return towards the rest position, a moveable friction member made to move by the pedal arm, a returning spring for returning the moveable friction member to its original position, and a housing for guiding the moveable friction member in a freely sliding manner. A frictional force generating mechanism for generating a prescribed frictional force is therefore constituted by the moveable friction member and housing. According to this frictional force generating mechanism, a function is provided where a fixed frictional force acts in such a manner that a pedal load is exerted upon the accelerator pedal while the accelerator pedal is being depressed, while on the other hand, a fixed frictional force resisting the urging force of the return spring acts so as to reduce the returning force of the accelerator pedal when the accelerator pedal is returning. A desired position can therefore be maintained for the accelerator pedal when travelling at a fixed speed because a prescribed operating load (pedal load) is acting on the accelerator pedal and driver fatigue can be alleviated.

Figure 8:
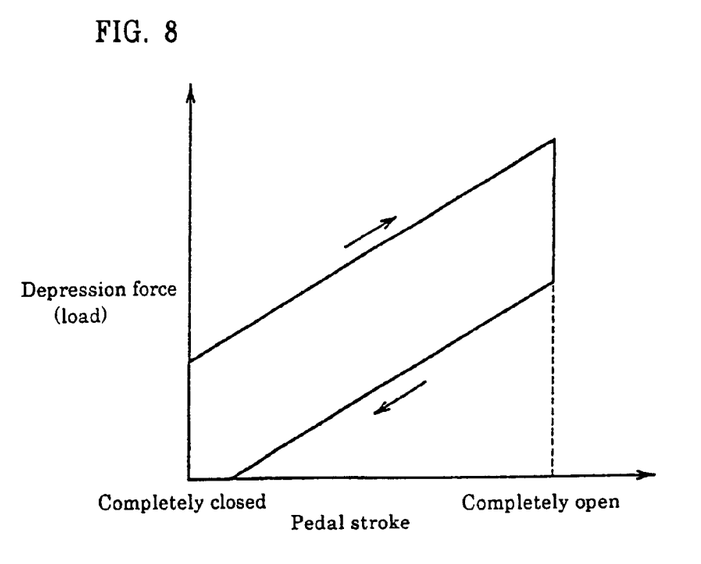
FIG. 8 is a graph showing hysteresis for depression force of a related accelerator pedal assembly.
Figure 9:
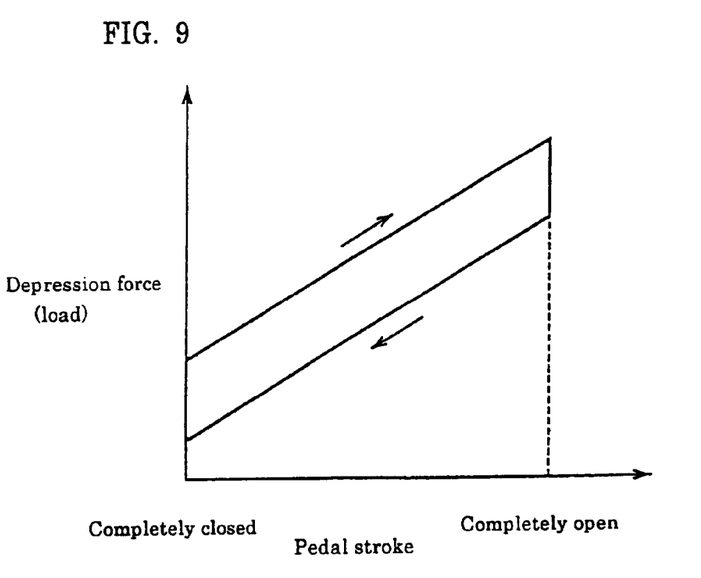
FIG. 9 is a graph showing hysteresis for depression force of another related accelerator pedal assembly.

With the accelerator pedal apparatus equipped with the aforementioned frictional force generating mechanism, as shown in FIG. 8 and FIG. 9, the relationship between the depression force of the accelerator pedal (pedal load) and the amount of movement of the accelerator pedal (stroke) is that of hysteresis of a fixed width from the throttle being completely closed (commencement of depression of the accelerator pedal) to being completely open (position of maximum depression). Therefore, as shown in FIG. 8, if the depression force (pedal load) is aligned to that required on the completely open side of the throttle, the returning force is insufficient at the completely closed position and the accelerator response (accelerator feeling) deteriorates. On the other hand, as shown in FIG. 9, when the depression force (pedal load) is aligned to that required on the completely closed side, either the driver or the accelerator pedal will vibrate with respect to vibrations of the vehicle on the completely open side, and there is the possibility that driveability will deteriorate.

In order to resolve the aforementioned problems, it is the object of the present invention to provide an accelerator pedal assembly fulfilling a required hysteresis characteristic for depression force (operating load) required from the throttle being completely closed to being completely open, i.e. over the entire range of movement of the accelerator pedal, which has a straightforward structure, is small in size, and contributes to superior driveability.

SUMMARY OF THE INVENTION

The accelerator pedal assembly of the present invention comprises a pedal arm capable of moving from a rest position to a position of maximum depression as a result of depression force transmitted from an accelerator pedal. A pedal shaft supports the pedal arm in a freely sliding manner and a return spring urges the pedal arm back towards the rest position. A frictional force generating mechanism generates frictional force according to movement of the pedal arm, and comprises a sliding guide path defining a sliding surface for generating frictional force and a frictional force varying means located within the sliding guide path for varying frictional force according to movement of the pedal arm in such a manner that frictional force generated when the pedal arm moves towards the position of maximum depression increases according to the amount of movement, and frictional force generated when the pedal arm moves towards the rest position is reduced according to the amount of movement.

According to this configuration, the frictional force varying means increases frictional force generated within the sliding path according to the amount of movement when the accelerator pedal is being depressed so that the pedal arm moves from the rest position to the position of maximum depression so that a frictional force increasing according to the amount of depression of the accelerator pedal is added to the urging force of the return spring to act as the pedal load. On the other hand, the frictional force varying means reduces frictional force generated within the sliding guide path according to the amount of movement when the pedal arm is moving from the position of maximum depression to the rest position (returning) so that an urging force that is the urging force of the return spring, with a frictional force reduced according to the extent of returning of the accelerator pedal subtracted, acts as a pedal load. As a result, a pedal load characteristic is obtained wherein hysteresis has a minimum width at the rest position and a maximum width at the position of maximum depression.

The generated frictional force acts on the sliding surface of the sliding guide path and the direction of the reaction incurred by the pedal arm coincides with the direction of the action of the pedal arm on the frictional force generating mechanism (a direction opposing by 180 degrees). This means that structural parts such as the pedal shaft supporting the pedal arm are not subjected to excessive force and the reliability of operation is therefore increased.

The frictional force varying means has a configuration comprising a moveable friction member made to move within the sliding guide path by a load applied from the pedal arm. The moveable friction member is displaced in a direction orthogonal to the direction of movement in response to the load in such a manner as to push against the sliding surface. A returning spring generates an urging force for urging the moveable friction member in a direction resisting the load of the pedal arm, the moveable friction member being subject to displacement in a direction orthogonal to the direction of movement according to the urging force, the returning spring pushing the moveable friction member against the sliding surface so as to return the moveable friction member to the original position.

According to this configuration, when the moveable friction member moves towards the position of maximum depression due to the depression load of the pedal arm, the urging force of the returning spring also increases in response to the amount of movement. The pushing force with which the moveable friction member pushes against the sliding guide path (sliding surface), i.e. the frictional force, also increases according to the amount of movement. Further, when the moveable friction member moves towards the rest position due to the urging force of the returning spring, the urging force of the returning spring also becomes smaller in response to the amount of movement. The pushing force with which the moveable friction member pushes against the sliding guide path (sliding surface), i.e. the frictional force, therefore also decreases according to the amount of movement.

With the accelerator pedal assembly of the present invention, a configuration can be adopted where the frictional force varying means comprises a first moveable friction member moving within the sliding guide path due to the load of the pedal arm and having a first inclined surface forming a prescribed angle with respect to the direction of movement, a second moveable friction member, positioned opposite the first moveable friction member with respect to the direction of movement, moving within the sliding guide path and having a second inclined surface making contact with the first inclined surface, and a returning spring for urging the second moveable friction member in a direction opposing the load of the pedal arm so as to return the second moveable friction member to an original position.

According to this configuration, when the first moveable friction member and the second moveable friction member move towards the position of maximum depression due to the depression load of the pedal arm, the first moveable friction member and the second moveable friction member are pushed towards the sliding guide path by the wedging action of the first inclined surface and the second inclined surface. Frictional force therefore also increases according to the amount of depression (moving amount) because this pressing increases according to the amount of depression of the accelerator pedal, i.e. according to increases in the amount of compression (urging force) of the returning spring.

On the other hand, when the first moveable friction member and the second moveable friction member move towards the rest position due to the urging force of the returning spring, the amount of compression (urging force) of the returning spring is also reduced according to the amount of returning movement (amount of movement). The pushing force with which the first moveable friction member and the second moveable friction member are pushed along the sliding guide path, i.e. the frictional force, is also reduced according to this returning amount (amount of movement).

In the above configuration, a configuration can be adopted where a play load spring, generating a smaller urging force than the urging force of the returning spring, is located between the first moveable friction member and the second moveable friction member in a direction mutually avoiding the first moveable friction member and the second moveable friction member.

Accordingly, in a region from the rest position starting towards the position of maximum depression, it is possible to appropriately set a play region where the throttle valve does not operate even when depression force from the accelerator pedal acts on the pedal arm or to appropriately set a load characteristic to give a desirable feeling during operation.

An alternative configuration can be adopted wherein the play load is provided by an initial compression region of the return spring, instead of a separate play load spring.

In the above configuration, the returning spring may comprise a plurality of coil springs of different diameters. According to this configuration, the degree of freedom when setting urging force due to the returning spring can be increased, which contributes to making the assembly smaller. In the above alternative configuration of the play load, if the returning spring comprises a plurality of coil springs, one of such plurality of coil springs may be used to provide the play load. With the above configuration, the free end of the pedal arm can be arranged to freely engage with and release from the first moveable friction member. Accordingly, when the pedal arm is returning towards the rest position, the pedal arm is reliably returned to the rest position even if the first moveable friction member or the second contacting member become stuck and cannot return to the original position.

DETAILED DESCRIPTION OF THE PREFERRED EMBODIMENTS

The following is a description with reference to the appended drawings of embodiments of the present invention.

Figure 4:
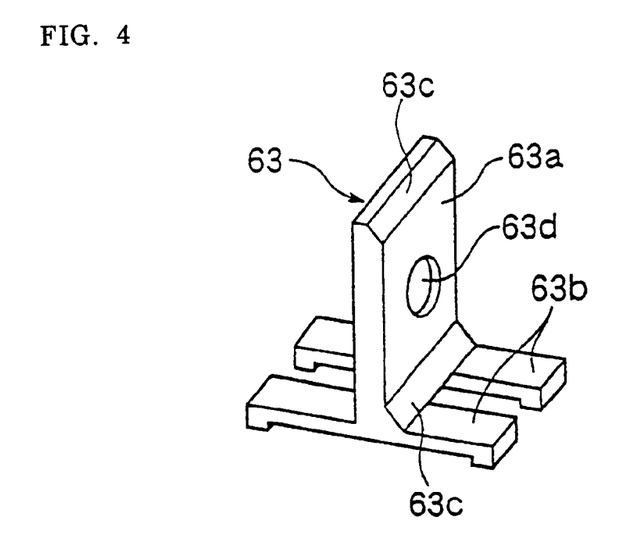
FIG. 4 is a perspective view showing a first moveable friction member.
Figure 5:
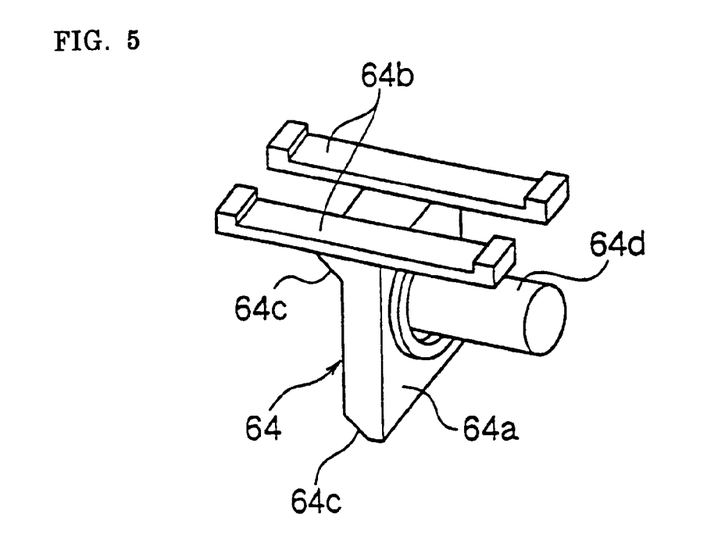
FIG. 5 is a perspective view showing a second moveable friction member.
Figure 6:
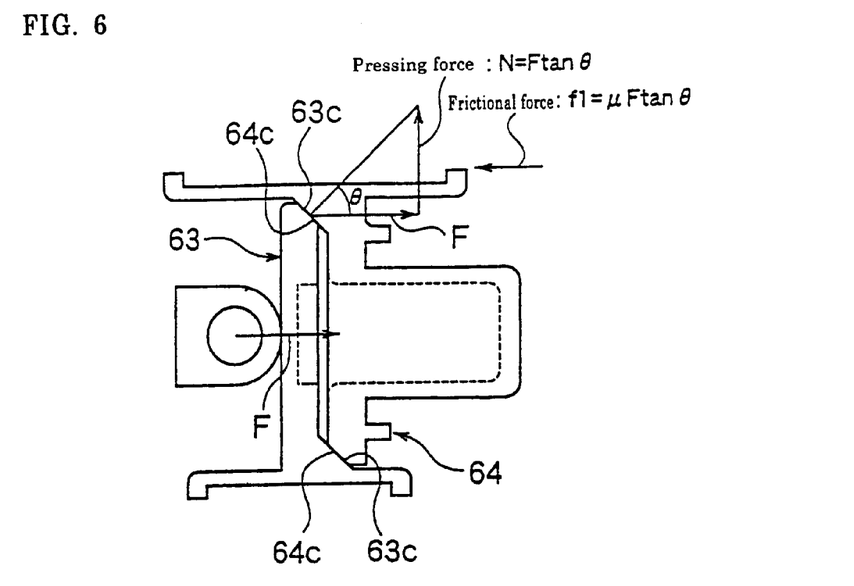
FIG. 6 is a view illustrating the operation of a frictional force varying mechanism.
Figure 7:
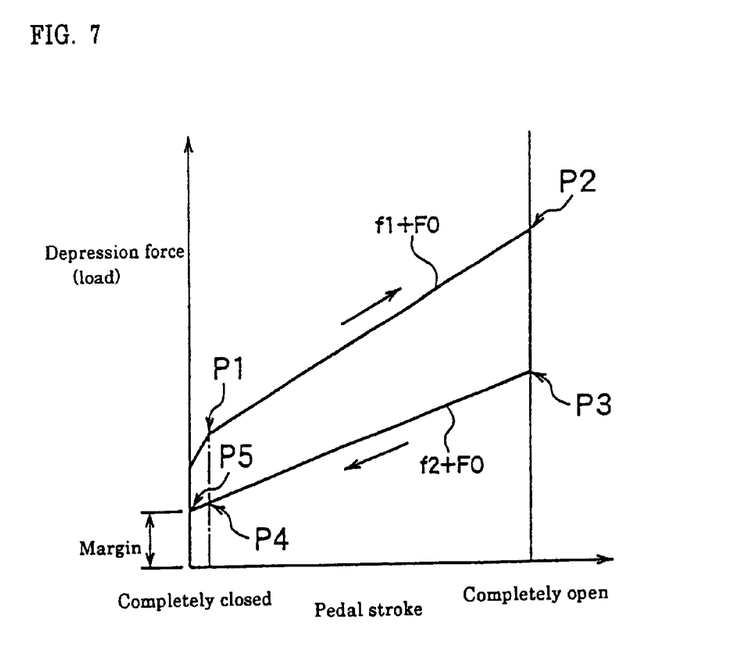
FIG. 7 is a graph showing hysteresis for depression force of the accelerator pedal assembly.

FIG. 1 to FIG. 7 show an embodiment of an accelerator pedal assembly of the present invention, with FIG. 1 to FIG. 5 showing the configuration, and FIG. 6 and FIG. 7 showing the operation and the depression force characteristics.

Figure 1:
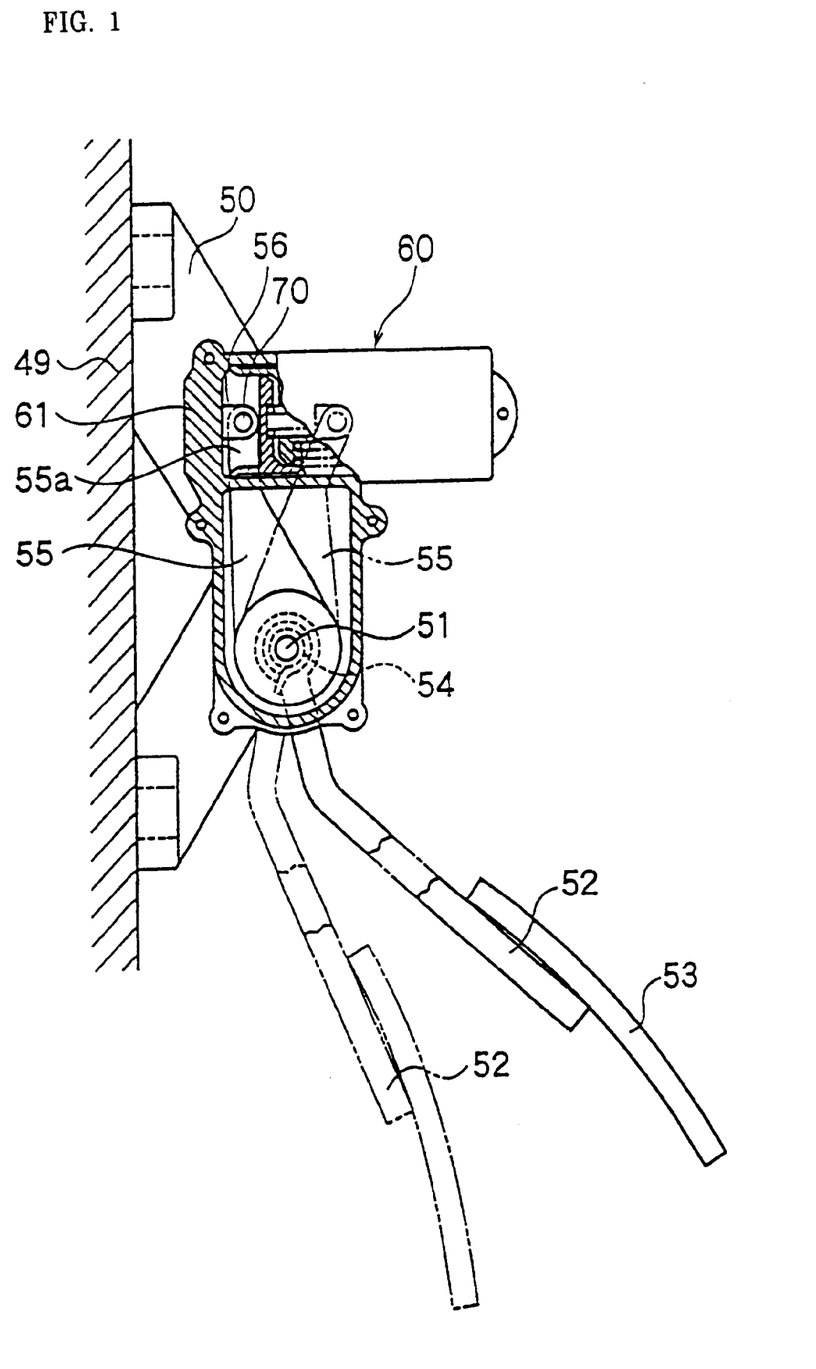
FIG. 1 is a side view showing an accelerator pedal assembly according to a first embodiment of the present invention.

As shown in FIG. 1, the accelerator pedal assembly of this embodiment is equipped with a basic configuration comprising a bracket 50 fixed to a vehicle body 49 of an automobile, etc., a pedal shaft 51 fixed to the bracket 501 a pedal arm 52 supported in a freely slidable manner by the pedal shaft 51, an accelerator pedal 53, which will be subjected to depression force by a driver, a return spring 54 located about the pedal shaft 51, a lever 55 fixed to the pedal arm 52 at a region above the pedal shaft 51, a frictional force generating mechanism 60 located in a region at an upper end 55*a* of the lever 55 (a portion corresponding to the free end of the pedal arm 52), and an accelerator position sensor (not shown) for detecting the amount of depression of the accelerator pedal 53.

Figure 2:
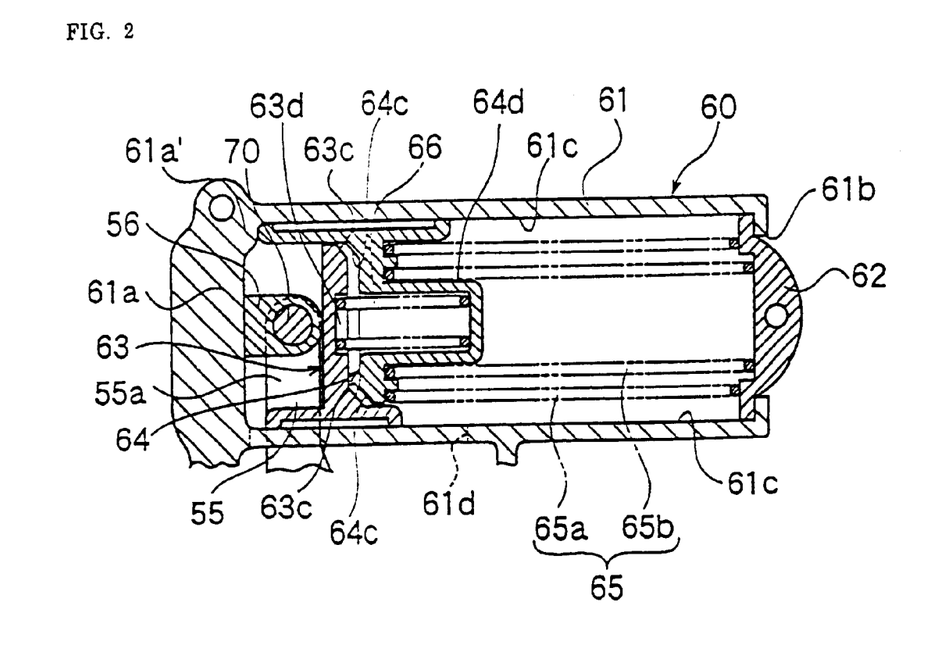
FIG. 2 is a longitudinal cross-sectional view showing a frictional force generating mechanism constituting part of the accelerator pedal assembly of FIG. 1.
Figure 3:
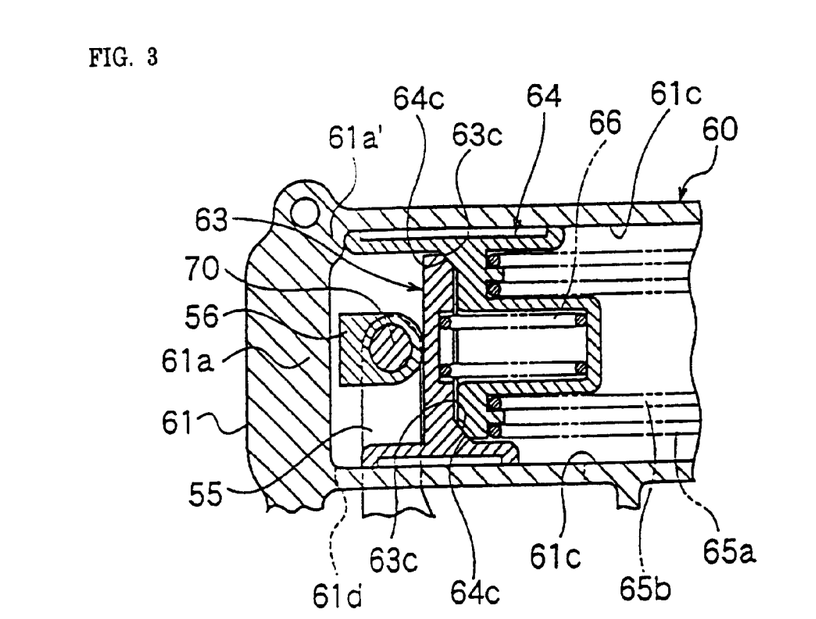
FIG. 3 is a longitudinal cross-sectional view showing part of the frictional force generating mechanism.

The accelerator pedal 53 is fixed to the lower end of the pedal arm 52 and the pedal arm 52 uses the pedal shaft 51 as a fulcrum. The upper end thereof, i.e. the upper end 55*a* of the lever 55, is formed as a free end acting on the frictional force generating mechanism 60. The pedal arm 52 swings about the pedal shaft 51 as a result of adjusting the amount of depression of the accelerator pedal 53 so that there is movement between the rest position (the position shown by the solid line in FIG. 1) and a maximum depression position, so that the load applied to the frictional force generating mechanism 60 is adjusted. As shown in FIG. 1 to FIG. 3, a contacting member 56 for reliably engaging with and releasing from a first moveable friction member 63 (described later) is fitted at the upper end 55*a* of the pedal arm 52, with the load of the pedal arm 52 being transmitted via this contacting member 56. Positions shown by the double-dotted lines in FIG. 1 represent positions midway between the rest position and the position of maximum depression.

The return spring 54 goes around the pedal shaft 51 with one end catching and holding onto the bracket 50 and another end catching and holding onto the pedal arm 52. The return spring applies an urging force for causing the pedal arm 52 (accelerator pedal 53), when depressed from the rest position towards the position of maximum depression, to return to the original rest position.

The accelerator position sensor is fixed to the bracket 50 and a sensor drive pin 70 is coupled with the contacting member 56 and the upper end (free end) 55*a* of the lever 55, as shown in FIG. 1 to FIG. 3. When the pedal arm 52 swings, the swinging displacement is received by the accelerator position sensor via the sensor drive pin 70, and the amount of depression of the accelerator pedal 53 is detected. The accelerator position sensor employs a contact resistance method, and as this structure is well-known, a description of this structure is omitted.

The frictional force generating mechanism 60 generates a frictional force according to movement of the pedal arm 52 (lever 55). As shown in the longitudinal cross-sections of FIG. 2 and FIG. 3, the frictional force generating mechanism 60 comprises a cylindrical housing 61 fitted into the bracket 50 and an end plate 62, the first moveable friction member 63 and a second moveable friction member 64 both fitted so as to move in a freely reciprocating manner within the housing 61, a returning spring 65 urging the second moveable friction member 64 back towards an original position (towards the position shown in FIG. 2), and a play load spring 66 located between the first moveable friction member 63 and the second moveable friction member 64.

The housing 61 is formed with a substantially rectangular cross-sectional shape using a material such as stainless steel that has both strength and rust-preventing properties, with a closing wall 61*a* formed at a left end and an opening 61*b* formed at a right end. As shown in FIG. 2, the end plate 62 is fitted so as to cover the opening 61*b* with the first moveable friction member 63, play load spring 66, second moveable friction member 64 and returning spring 65 being housed in order within the housing 61.

An inner wall 61*c* of the housing 61 therefore acts as a sliding surface and forms a sliding guide path for guiding the first moveable friction member 63 and the second moveable friction member 64 in a freely sliding manner. As shown in FIG. 2 and FIG. 3, a long notch (slit) 61*d* is formed at a lower side of the housing 61, with the free end of the pedal arm 52, i.e. the upper end (free end) 55*a* of the lever 55 and the contacting member 56, being inserted in a freely reciprocating manner inside the housing 61 via the notch (slit) 61*d*. A notch (not shown) is formed in the side wall of the housing 61 for fitting and permitting movement of the sensor drive pin 70.

As shown in FIG. 4, the first moveable friction member 63 is formed using material that is very conducive to enabling sliding, such as oil-impregnated polyacetal, etc., and is comprised of a main body 63*a* that is substantially rectangular in shape, two contacting arms 63*b* formed integrally at a lower side of the main body 63*a* and extending in a direction along the inner wall 61*c* (see e.g. FIG. 3), a first inclined surface 63*c* formed so that an angle formed by a normal thereof with respect to the direction of extension of the contacting arms 63*b* is θ (see e.g. FIG. 6), and a recess 63*d* formed approximately at a central part of the main body 63*a*.

As shown in FIG. 5, the second moveable friction member 64 is formed using material that is very conducive to enabling sliding, such as oil-impregnated polyacetal, etc., and is comprised of a main body 64*a* that is substantially rectangular in shape, two contacting arms 64*b* formed integrally at the upper side of the main body 64*a* and extending in a direction along the inner wall 61*c* of the housing 61 (see e.g. FIG. 3), a second inclined surface 64*c* formed so that an angle formed by a normal thereof with respect to the direction of extension of the contacting arms 64*b* is θ, and a cylindrical section 64*d* formed with a closed end approximately at a central part of the main body 64*a*. As shown in FIG. 2 and FIG. 3, the play load spring 66 is preferably a compression-type coiled spring with one end housed in the recess 63*d* of the first moveable friction member 63, and the other end housed in the cylindrical section 64*d* of the second moveable friction member 64, with the first moveable friction member 63 and the second moveable friction member 64 generating urging forces in mutually opposite directions. The urging force of the play load spring 66 is set to be smaller than or the same as the urging force of the returning spring 65 in its fully extended state when the play load spring 66 is at its most compressed.

As shown in FIG. 2 and FIG. 3, the returning spring 65 may include a first returning spring 65*a* that is a compression-type coil spring with a large diameter and a second returning spring 65*b* that is a similar compression-type coil spring with a small diameter. The returning spring 65 is located between the second moveable friction member 65 and the end plate 62. The degree of freedom in setting the urging force is increased and the assembly is made smaller by using two coil springs for the returning spring 65.

As shown in FIG. 2 and FIG. 3, the first moveable friction member 63 and the second moveable friction member 64 are located facing each other along the direction of movement along the inner wall (sliding guide path) 61c of the housing 61 so that the first inclined surface 63c and the second inclined surface 64c make contact with each other. When the first moveable friction member 63 and the second moveable friction member 64 push against each other, as a result of the wedging operation of the first inclined surface 63c and the second inclined surface 64c, the inner wall 61c of the housing 61 is pushed against in such a manner that the first moveable friction member 63 pushes downwards and the second moveable friction member 64 pushes upwards. That is, the first moveable friction member 63 and the second moveable friction member 64 push in mutually opposing directions orthogonal with respect to the direction of movement guided by the inner wall (sliding guide path) 61c.

For example, as shown in FIG. 6, when a load F of the pedal arm 52 (lever 55) acts from the outside on the first moveable friction member 63 (the left side in FIG. 6), there is movement in such a manner that the first moveable friction member 63 and the second moveable friction member 64 remain in contact. Therefore, at the instant of this movement, an urging force F of the returning spring 65 acts as a reactive force from the outside of the second moveable friction member 64 (the right side in FIG. 6) in a direction resisting this load F.

Therefore, when the accelerator pedal 13 (pedal arm 12) is depressed, the first moveable friction member 63 and the second moveable friction member 64 move towards the position of maximum depression (towards the right side in FIG. 6). At this time, a pushing force of N=F tan θ acts on the inner wall 61c of the housing 61, with the first moveable friction member 63 pushing downwards and the second moveable friction member 64 pushing upwards so as to both be pushing away from each other.

That is, when the accelerator pedal 53 is depressed, if a coefficient of friction of the sliding surface between the first moveable friction member 63 and second moveable friction member 64 and the inner wall (sliding guide path) 61c is taken to be μ while the first moveable friction member 63 and second moveable friction member 64 are moving in a direction towards the position of maximum depression (towards the right side in FIG. 6), a frictional force f1=μN, i.e. f1=μF tan θ acts in a direction opposite to the direction of movement (to the left in FIG. 6).

On the other hand, when the accelerator pedal 53 (pedal arm 52) returns towards the rest position prior to depression, the first moveable friction member 63 and the second moveable friction member 64 move towards the rest position (towards the left side in FIG. 6) due to the urging force F of the returning spring 65. At this time, the first moveable friction member 63 and the second moveable friction member 64 provide a pushing force of N=F tan θ, with the first moveable friction member 63 pushing downwards and the second moveable friction member 64 pushing upwards.

Namely, when the accelerator pedal 53 returns, if a coefficient of friction of the sliding surface between the first moveable friction member 63 and second moveable friction member 64 and the inner wall (sliding guide path) 61c is taken to be μ while the first moveable friction member 63 and the second moveable friction member 64 are moving in a direction towards the rest position (towards the left side in FIG. 6), a frictional force f2=−μN, i.e. f2=−μF tan θ, acts in a direction opposite to the direction of movement (to the right in FIG. 6).

Describing this as a power function, in order to express a load F of the pedal arm 52 and an urging (reactive) force F of the returning spring 65 as a linear function of an amount of depression (x) of the accelerator pedal 53, frictional force f1, when going from the rest position to the position of maximum depression, can be expressed by:

$$f1 = \mu F(x) \tan \theta.$$

A frictional force of $$f1(0) = \mu F(0) \tan \theta$$

acts at the time of the rest position (x=0), while on the other hand, a frictional force of $$f1(\max) = \mu F(\max) \tan \theta$$

acts when the position of maximum depression (x=max) is reached. At this time, the frictional force f1 generated in response to the amount of movement (x) when the pedal arm 52 moves towards the position of maximum depression is shown to increase linearly due to the relationship $$f1(\max) > f1(0).$$

On the other hand, the frictional force f2 generated while the accelerator pedal 53, i.e. the pedal arm 52, is moving from the position of maximum depression towards the rest position can be expressed as $$f2 = -\mu F1(x) \tan \theta.$$

A frictional force of $$f2(\max) = -\mu F(\max) \tan \theta$$

acts at the time of the position of maximum depression (x=max), while on the other hand, a frictional force of $$f2(0) = -\mu F(0) \tan \theta$$

acts when the rest position (x=0) is reached. At this time, frictional force f2 generated in response to the amount of movement (x) when the pedal arm 52 moves towards the rest position is shown to decrease linearly due to the relationship $$|f2(\max)| > |f2(0)|.$$

As is clear from the above description, by constructing a frictional force varying means from the first moveable friction member 63 located within the inner wall (sliding guide path) 61c of the housing 61, the second moveable friction member 64 and the returning spring 65, the frictional force f1 generated when the pedal arm 52 moves towards the position of maximum depression is made to increase according to the amount of movement, and the frictional force f2 generated when the pedal arm 52 moves towards the rest position is made to decrease according to this amount of movement. That is, a frictional force varying means is provided that changes the frictional force according to movement of the pedal arm 52.

Further, depression force (pedal load) characteristics for the accelerator pedal 53 can be obtained as the hysteresis shown in FIG. 7 by combining the frictional forces f1 and f2 obtained using the first moveable friction member 63, the second moveable fricton member 64, the urging force of the return spring 54, the urging force of the play load spring 66 and the urging force of the returning spring 65. Regarding the path towards the position of maximum depression and the path returning to the rest position, the hysteresis is small (narrow) on the rest position side, the response and feeling of operation are good, and the margin allowing for incorrect return of the accelerator pedal 53 is large.

On the other hand, the hysteresis becomes large (wide) on the side of the position of maximum depression, and control of the vehicle (engine) becomes good.

Next, the operation of the accelerator pedal assembly is described based on FIG. 7.

First, the pedal arm 52 (and accelerator pedal 53) is positioned at the rest position (the position corresponding to the throttle valve being completely closed), with the accelerator pedal 53 not being depressed at all. At this time, the return spring 54 and the play load spring 66 act on the pedal arm 52, and as shown in FIG. 2, the contacting member 56 makes contact with the closing wall 61*a* and is stopped at the rest position.

Further, as shown in FIG. 2, the second moveable friction member 64 is urged by the urging force of the returning spring 65 and one end of the contacting arms 64*b* makes contact with a stopper 61*a*' formed at the closing wall 61*a* of the housing 61 to be held in the rest position. Moreover, the first moveable friction member 63 is urged by the play load spring 66, comes away from the second moveable friction member 64 to make contact with the contacting member 56, and is held at the rest position.

When the accelerator pedal 53 is depressed from the rest position so that the pedal arm 52 starts to move towards the position of maximum depression, the first moveable friction member 63 compresses the play load spring 66 due to the load F applied from the free end of the pedal arm 52(the contacting member 56 fitted to the upper end 55*a* of the lever 55), so that when movement starts (towards the right of FIG. 2), contact is made with the second moveable friction member 64 in the manner shown in FIG. 3 after movement over a prescribed distance, i.e. at point P1 in FIG. 7. During compression of the play load spring 66, the first moveable friction member 63 slides along the sliding guide path (inner wall surface) 61*c* of the housing 61, but the frictional force due to this sliding is set to be extremely small.

When the accelerator pedal 53 is depressed further, the first moveable friction member 63 and the second moveable friction member 64 start to move towards the right in FIG. 3. The frictional force f1 starts to act in a direction to the left in FIG. 3 between the contacting arms 63*b* of the first moveable friction member 63 and the contacting arms 64*b* of the second moveable friction member 64 and the inner wall (sliding guide path) 61*c* of the housing 61. This is due to the wedging action of the first inclined surface 63*c* of the first moveable friction member 63 and the second inclined surface 64*c* of the second moveable friction member 64. The depression force of the accelerator pedal 53 increases along the line f1+F0, and becomes f1(max)+F0(max) when the position of maximum depression P2 is reached, so that a maximum load or depression force value is reached.

When the accelerator pedal 53 starts returning, due to weakening of the depression force, from a state where the accelerator pedal 53 is positioned at the position of maximum depression, the second moveable friction member 64 and the first moveable friction member 63 start to move toward the rest position (towards the left side in FIG.3) due to the urging force of the returning spring 65. At the same time, a frictional force f2 starts to act in a direction to the right in FIG. 3 between the contacting arms 64*b* of the second moveable friction member 64 and the contacting arms 63*b* of the first moveable friction member 63 and the inner wall (sliding guide path) 61*c* of the housing 61. This is due to the wedging action of the second inclined surface 64*c* of the second moveable friction member 64 and the first inclined surface 63*c* of the first moveable friction member 63. The frictional force f2 occurring at the point P3 in FIG. 7 then becomes f2(max)+F0 (0). The depression force of the accelerator pedal 53 decreases along the line f2+F0. The contacting arms 64*b* of the second moveable friction member 64 eventually come into contact with a stopper 61*a*', with the frictional force f2 no longer acting when movement is stopped (the point P4 in FIG. 7). The accelerator pedal 53 then reaches the rest position after passing through the point P5 in FIG. 7. When a depression and returning operation is performed with the accelerator pedal 53, the depression force changes along the hysteresis shown in FIG. 7.

Even when the second moveable friction member 64 or first moveable friction member 63 become stuck within the housing 61 so as not to be able to return, the free end of the pedal arm 52, i.e. the contacting member 56 fitted to the upper end 55*a* of the lever 55, is made in such a manner as to freely engage with and release from the first moveable friction member 63. The accelerator pedal 53 and the pedal arm 52 are therefore reliably returned to the rest position by the urging force of the return spring 54. This ensures a fail-safe function when the operating state of the accelerator pedal 53 is detected by the accelerator position sensor.

As described above, according to the accelerator pedal assembly of this embodiment, as a result of the simple structure of the first moveable friction member 63, the second moveable friction member 64 and the cylindrical housing 61, etc., and by appropriately setting the angle θ of the first inclined surface 63*c* and the second inclined surface 64*c*, an accelerator pedal assembly can be obtained where the depression (pedal load) hysteresis characteristic can be freely set, the operating feeling of the accelerator pedal 53 can be improved, and where accelerator control is good. The generation of vibrations or abnormal sounds in the vehicle can therefore be easily prevented. The structure is therefore simple, assembly is straightforward, and production costs can be reduced.

One aspect of the present invention is the play load that is provided by the play load spring 66. This play load allows the driver or operator to feel the beginning of the pedal stroke as if the pedal were connected to the throttle through a more traditional cable mechanism, which necessarily involved a certain amount of play. However, this play may be provided in other ways. One way involves using the beginning stroke of the returning spring 65 to provide such a play load, and is described in a specific embodiment with reference to FIG. 10.

Figure 10:
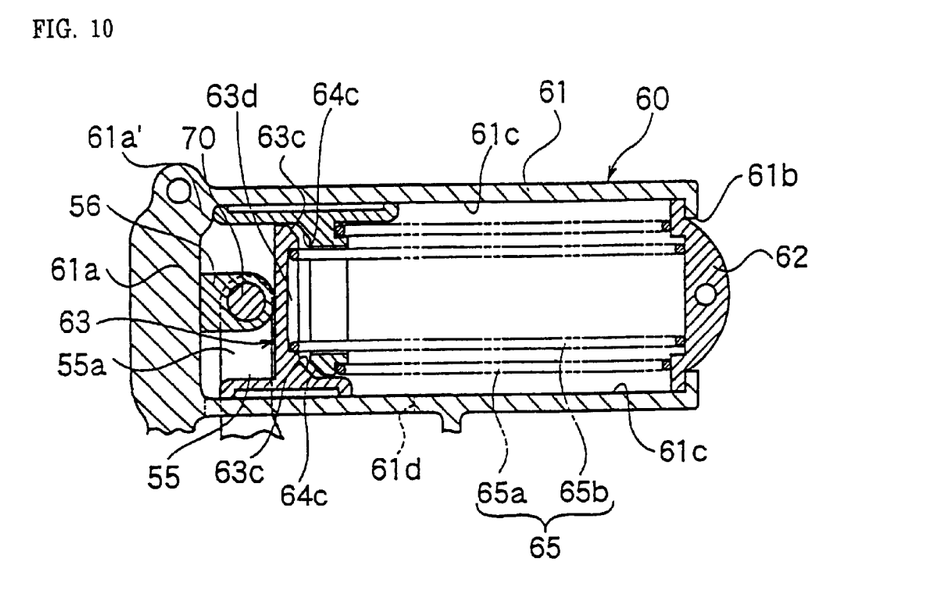
FIG. 10 is a longitudinal cross-sectional view showing an alternative frictional force generating mechanism using part of a returning spring for a play load.

FIG. 10 shows an alternate arrangement of the frictional force generating mechanism 60. Only differences with the above embodiment will be described. As can be seen from the figure, the play load spring 66 is no longer employed. One of the coil springs of the returning spring 65, in this case the second returning spring 65*b*, passes through an opening in the second moveable friction member 64 to be received in the recess 63*d* of the first moveable friction member 63. This structure eliminates the necessity for not only the play load spring 66, but also the cylindrical section 64*d* of the second moveable friction member 64.

In operation, when the accelerator pedal 53 is first depressed, the play load is first taken up by movement of the first moveable friction member 63 from the position as shown in FIG. 10 to that corresponding to FIG. 3. This corresponds to the movement of the point P1 in FIG. 7. Operation of this embodiment is otherwise similar to that of the above embodiment.

As described above, according to the accelerator pedal assembly of the present invention, by providing a frictional force varying means within a sliding guide path defining a sliding surface for generating frictional force provided as a friction generating mechanism in such a manner that frictional force generated when a pedal arm moves towards a position of maximum depression increases according to the amount of movement, and frictional force generated when the pedal arm moves towards a rest position decreases according to the amount of movement, the characteristics of the pedal load are such that the hysteresis is small (of narrow width) on the the rest position side and large (of broad width) on the maximum depression position side.

As a result, the accelerator pedal response, operation feeling, and vehicle control etc. can be improved, and vibration etc. can be prevented. In particular, the frictional force generated only acts within the sliding guide path, and therefore loads do not act on structural parts on the outside of the sliding guide path, such as, for example, a pedal shaft supporting the pedal arm, etc. Excessive force is therefore not applied to the pedal shaft and the reliability of the operation of the assembly is improved.

The margin allowing for insufficient return of the accelerator pedal can therefore be made large, and reliable operation can therefore be ensured.

In the above, the accelerator pedal assembly of the present invention is useful as an accelerator pedal assembly applied to a vehicle such as an automobile, etc., and is particularly applicable to accelerator pedal assemblies for automobiles etc. adopting drive by wire systems. While specific embodiments of the accelerator pedal assembly of the present invention have been described above, it should be noted that various changes and modificatons will occur to those of skill in the art, and should be considered within the scope of the present invention as defined by the claims.

The entire contents of International Application No. PCT/JP00/06188 and Japanese Application Nos. 11-260967, filed Sep. 14, 1999 and 11-305212, filed Oct. 27, 1999 are hereby incorporated by reference.

What is claimed is:

1. An accelerator pedal assembly comprising:
a pedal arm capable of moving from a rest position to a depressed position as a result of force applied thereto;
a pedal shaft supporting said pedal arm;
a return spring urging said pedal arm toward said rest position; and
a frictional force generating mechanism for generating a frictional force according to movement of said pedal arm, said frictional force generating mechanism comprising
a sliding guide path defining a sliding surface, and
a frictional force varying mechanism operable to vary frictional force according to movement of said pedal arm such that the frictional force generated during movement of said pedal arm increases during movement towards the depressed position and decreases during movement toward the rest position, said frictional force varying mechanism including
a first moveable friction member for engaging said sliding surface, said first moveable friction member being moveable in response to movement of said pedal arm and having a first inclined surface,
a second moveable friction member for engaging said sliding surface, said second moveable friction member having a second inclined surface engaging said first inclined surface of said first moveable friction member, and
a returning spring biasing said second moveable friction member toward a position corresponding to said rest position of said pedal arm.

2. The accelerator pedal assembly of claim 1, wherein said first moveable friction member and said second moveable friction member are moveable along said sliding guide path in a direction of movement by a load applied from said pedal arm and so as to be displaced in a direction orthogonal to the direction of movement to frictionally engage said sliding surface when said pedal arm is moved toward said depressed position and wherein said first moveable friction member and said second moveable friction member are moveable along said sliding guide path in a direction of movement by a load applied from said returning spring and so as to be displaced in a direction orthogonal to the direction of movement to frictionally engage said sliding surface when said pedal arm is allowed to move toward said rest position.

3. The accelerator pedal assembly of claim 1, and further comprising a play load spring biasing said first moveable friction member and said second moveable friction member apart from each other, said play load spring having a smaller biasing force than said returning spring.

4. The accelerator pedal assembly of claim 1, wherein said returning spring comprises a plurality of coil springs of different diameters.

5. The accelerator pedal assembly of claim 1, wherein said pedal arm comprises a free end that freely engages with and releases from said first moveable friction member.

6. An accelerator pedal assembly comprising:
an accelerator pedal capable of moving from a rest position to a depressed position as a result of force applied thereto; and
a frictional force generating mechanism operably connected with said pedal for generating a frictional force according to movement of said pedal, said frictional force generating mechanism comprising
a sliding guide path defining a sliding surface, and
a frictional force varying mechanism operable to vary frictional force according to movement of said pedal such that the frictional force generated during movement of said pedal increases during movement towards the depressed position and decreases during movement toward the rest position, said frictional force varying mechanism including
a first moveable friction member for engaging said sliding surface, said first moveable friction member being moveable in response to movement of said pedal and having a first friction generating portion and a first engagement surface,
a second moveable friction member for engaging said sliding surface, said second moveable friction member having a second friction generating portion and a second engagement surface engaged by said first engagement surface of said first moveable friction member such that when said first moveable friction member and said second moveable friction member are pressed toward each other, said first and second engagement surfaces cause said first and second moveable friction members to move towards engagement of said sliding surface with said first and second friction generating portions, and
a returning spring biasing said second moveable friction member toward a position corresponding to said rest position of said pedal.

7. The accelerator pedal assembly of claim 6, wherein said first moveable friction member and said second moveable friction member are moveable along said sliding guide path in a direction of movement by a load applied from said pedal arm and so as to be displaced in a direction orthogonal to the direction of movement to frictionally engage said sliding surface when said pedal arm is moved toward said depressed position and wherein said first moveable friction member and said second moveable friction member are moveable along said sliding guide path in a direction of movement by a load applied from said returning spring and so as to be displaced in a direction orthogonal to the direction of movement to frictionally engage said sliding surface when said pedal arm is allowed to move toward said rest position.

8. The accelerator pedal assembly of claim 6, and further comprising a play load spring biasing said first moveable friction member and said second moveable friction member apart from each other, said play load spring having a smaller biasing force than said returning spring.

9. The accelerator pedal assembly of claim 6, wherein said returning spring comprises a plurality of coil springs of different diameters.

10. The accelerator pedal assembly of claim 6, wherein said pedal arm comprises a free end that freely engages with and releases from said first moveable friction member.

11. An accelerator pedal assembly for use with an electronically controlled throttle system in a vehicle, comprising:
a pedal arm capable of moving from a rest position to a depressed position as a result of force applied thereto;
a pedal shaft supporting said pedal arm;
a return spring urging said pedal arm toward said rest position;
a frictional force generating mechanism for generating a frictional force according to movement of said pedal arm, said frictional force generating mechanism comprising
a sliding guide path defining a sliding surface, and
a frictional force varying mechanism operable to vary frictional force according to movement of said pedal arm such that the frictional force generated during movement of said pedal arm increases during movement towards the depressed position and decreases during movement toward the rest position; and
a play load mechanism generating a play load on said pedal arm in response to initial depression of said pedal arm such that when said pedal arm is at said rest position, a relatively small force is required to cause said pedal arm to move from said rest position toward said depressed position over an initial range of movement over which range of movement said frictional force varying mechanism is not operable, and after said initial range of movement, said frictional force varying is operable to increase a force required to further move said pedal arm toward said depressed position above said relatively small force.

12. The accelerator pedal assembly of claim 11, wherein said play load mechanism comprises a play load spring that provides the play load upon initial depression of said pedal arm.

13. The accelerator pedal assembly of claim 11, wherein said frictional force varying mechanism includes
a first moveable friction member for engaging said sliding surface, said first moveable friction member being moveable in response to movement of said pedal arm and having a first inclined surface,
a second moveable friction member for engaging said sliding surface, said second moveable friction member having a second inclined surface to be engaged by said first inclined surface of said first moveable friction member, and a returning spring biasing said second moveable friction member toward a position corresponding to said rest position of said pedal arm.

14. The accelerator pedal assembly of claim 13, wherein a play load spring is positioned between said first moveable friction member and said second moveable friction member and separates said first moveable friction member and said second moveable friction member at said rest position by a separation distance that is taken up by the initial depression of said pedal arm.

15. An accelerator pedal assembly for use with an electronically controlled throttle system in a vehicle, comprising:
a pedal arm capable of moving from a rest position to a depressed position as a result of force applied thereto;
a pedal shaft supporting said pedal arm:
a return spring urging said pedal arm toward said rest position:
a frictional force generating mechanism for generating a frictional force according to movement of said pedal arm, said frictional force generating mechanism comprising
a sliding guide path defining a sliding surface, and
a frictional force varying mechanism operable to vary frictional force according to movement of said pedal arm such that the frictional force generated during movement of said pedal arm increases during movement towards the depressed position and decreases during movement toward the rest position; and
a play load mechanism generating a play load on said pedal arm in response to initial depression of said pedal arm;
wherein said play load mechanism comprises a play load spring that provides the play load upon initial depression of said pedal arm;
wherein said frictional force varying mechanism includes
a first moveable friction member for engaging said sliding surface, said first moveable friction member being moveable in response to movement of said pedal arm and having a first inclined surface,
a second moveable friction member for engaging said sliding surface, said second moveable friction member having a second inclined surface to be engaged by said first inclined surface of said first moveable friction member, and
a returning spring biasing said second moveable friction member toward a position corresponding to said rest position of said pedal arm; and
wherein said returning spring comprises said play load spring and an additional spring, said play load spring being positioned to separate said first moveable friction member and said second moveable friction member at said rest position by a separation distance that is taken up by the initial depression of said pedal arm.

16. The accelerator pedal assembly of claim 15, wherein said second moveable friction member is biased by said additional spring and said first moveable friction member is biased by said play load spring such that after the separation distance has been taken up by initial depression of said pedal arm, further depression of said pedal arm is resisted by the biasing force of both said play load spring and said additional spring.

* * * * *